Feb. 18, 1947. B. A. SWENNES 2,416,128
AMPHIBIAN VEHICLE
Filed April 6, 1944 2 Sheets-Sheet 2
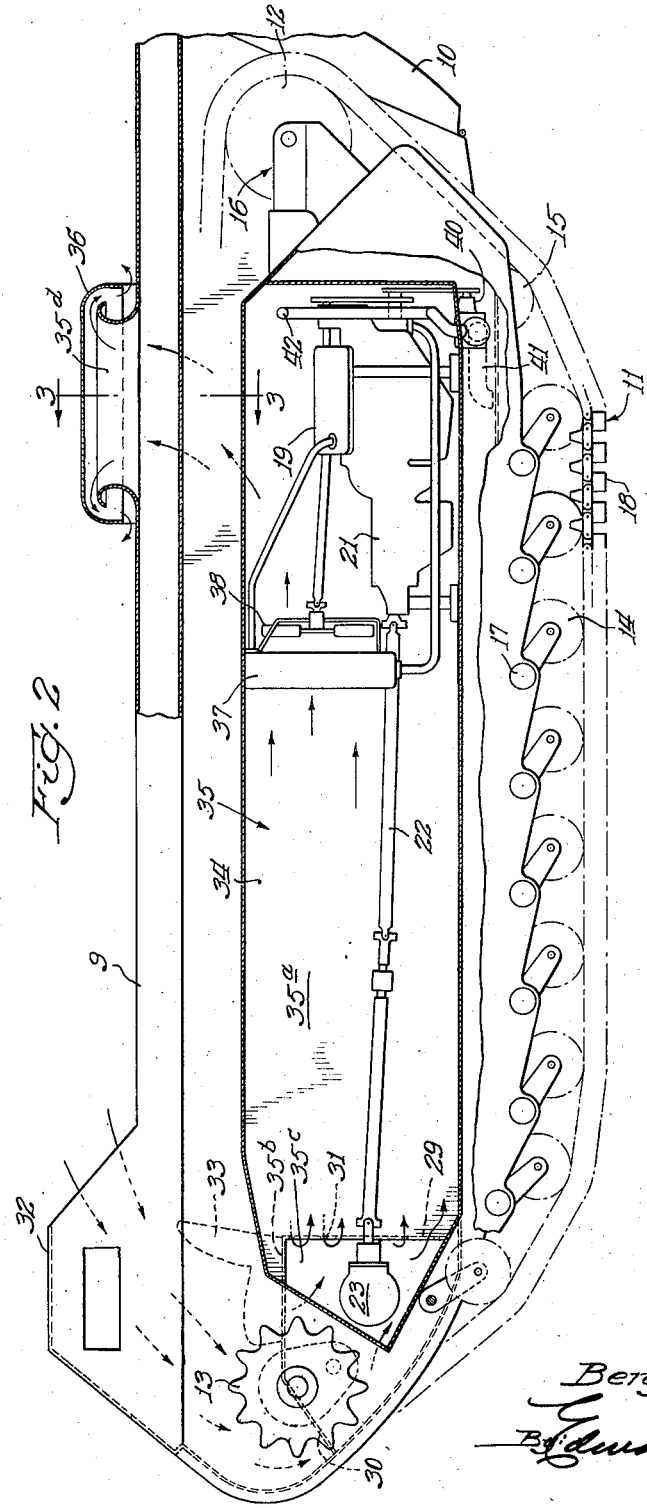
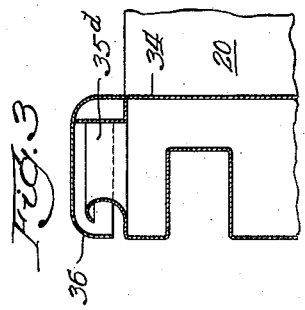
Inventor:
Benjamin A. Swennes Patented Feb. 18, 1947

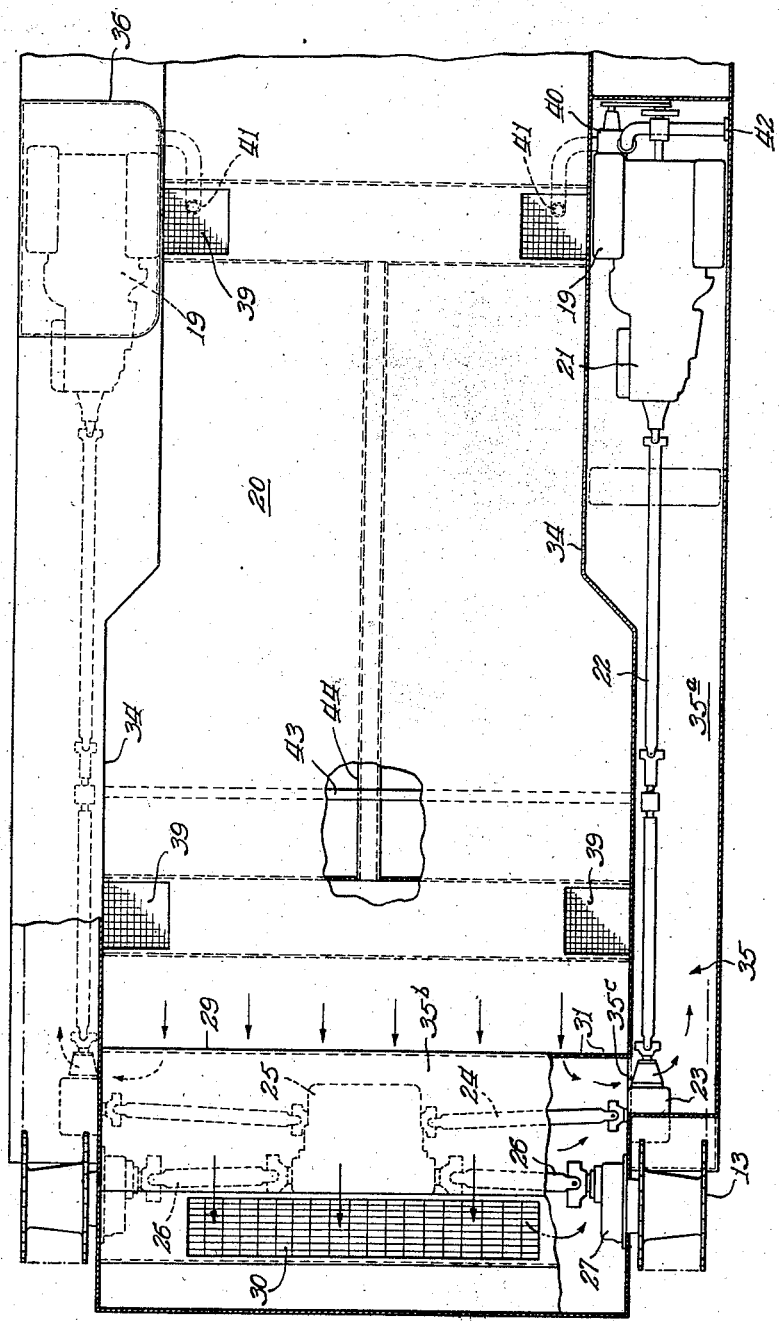

2,416,128

UNITED STATES PATENT OFFICE 2,416,128

AMPHIBIAN VEHICLE

Benjamin A. Swennes, Rockford, Ill., assignor to Borg-Warner Corporation, Chicago, Ill., a corporation of Illinois Application April 6, 1944, Serial No. 529,727

17 Claims. (Cl. 115—1)

My invention relates to motor vehicles and more particularly to amphibian motor vehicles having tracks on opposite sides for propelling the vehicles either over land or through the water.

In my copending application, Serial No. 508,304, filed October 30, 1943, there is disclosed an amphibian motor vehicle particularly adapted for carrying cargo. This vehicle is powered by two engines disposed adjacent opposite sides of the vehicle and providing between them an open load space. The motors in such a vehicle must, of course, be cooled and must be provided sufficient air for use by the motor carburetors and in prior amphibian vehicles having a motor therein for driving the vehicle and having an open load space therein, the motor was air-cooled and air was provided for use by the motor carburetor by drawing such air from the load space. With such a construction, when the vehicle was used in heavy seas whereby water swept into the load space, a substantial amount of water was taken in with the air for the motor, and this water often caused a stoppage of the motor. It is an object of my invention to provide a cooling and air supplying arrangement for a motor or motors in such a vehicle and particularly for the two-engined vehicle shown in my prior application by means of which the water carried to the motors with the air is kept at a minimum. To this end it is an object of my invention to provide a cab on such a vehicle which partially covers the load space in the vehicle and to provide a conduit having its entrance underneath this cab for supplying air to each motor whereby water that sweeps into the load space does not in general wash into the cooling air conduit.

Vehicles of this type are commonly provided with a differential transmission adjacent an end of the vehicle which is connected with track driving sprockets on each side of the vehicle. When the vehicle is large, such as is contemplated in my aforesaid copending application, this differential transmission becomes heated when the vehicle is in use, particularly when the differential transmission is such that it may be controlled for steering the vehicle. In prior vehicles of this type, such a controlled differential transmission was cooled by means of radiators for the oil in the transmission and a fan was provided for cooling the radiators. It is an object of my invention to provide an improved construction and arrangement for cooling such a controlled differential transmission in a vehicle of this type, and to this end it is an object of my invention to provide the entrance of the duct supplying air to a motor of such a vehicle as above described adjacent and around about the controlled differential transmission so that the air supplied to a motor for cooling it has the additional function of cooling the transmission by circulating about the transmission. The entrance to the air duct for the motor preferably simply constitutes a housing for the controlled differential transmission having a plurality of air inlet openings therein such that air entering these openings circulates about the differential transmission.

It is a further object of my invention to provide an improved air discharge for an air duct provided for supplying air to a motor in a vehicle of this type having a load space therein, and more particularly it is an object to provide such an air discharge which permits none of the air discharged to enter the load space of the vehicle and discharges air sidewardly and endwardly of the vehicle.

The invention consists of the novel constructions, arrangements and devices to be hereinafter described and claimed for carrying out the above stated objects and such other objects as will appear from the following description of a certain preferred embodiment illustrated in the accompanying drawings, wherein:

Fig. 1 is a plan view, partially cut away, of an amphibian vehicle which embodies the principles of my invention and which is of the type disclosed in my aforesaid copending application;

Fig. 2 is a side elevational view, partially cut away, of the amphibian vehicle; and Fig. 3 is a sectional view taken on line 3—3 of Fig. 2.

Like characters of reference designate like parts in the several views.

Referring now to the drawings, there is illustrated an amphibian vehicle comprising a watertight body 9 which is provided with a gate 10 on its rear end. A pair of movable tracks 11 are disposed in looped configuration on opposite sides of the body, and the tracks are held in such configuration on each side of the vehicle by means of an idler wheel 12, a driving sprocket wheel 13, a plurality of bogey wheels 14 and a second idler wheel 15. The idler wheel 12 is preferably provided with adjustable means 16 of any suitable construction for moving the wheel longitudinally of the vehicle to adjust the tightness in the track 11 supported by the wheel. The sprocket wheel 13 is driven by means hereinafter to be described, and the bogey wheels 14 are mounted on the body 9 by units 17 yieldingly and swingingly mounting the wheels with respect to the body. The track 11 is provided with lugs or grousers 18 of any suitable shape such that the tracks on both sides of the vehicle when driven by the sprockets 13 will propel the vehicle through the water, and the vehicle may, of course, be also driven over land by the tracks 11 similar to other track laying vehicles.

A pair of motors 19 disposed adjacent opposite sides of the body 9 and providing between them a load space 20 are provided for driving the sprocket wheels 13 and thereby the tracks 11. The motors 19 each have a transmission 21, which is of any suitable construction to provide a plurality of forward speed ratios and reverse, connected in tandem therewith. The transmissions 21 are each connected to drive a drive shaft 22 extending longitudinally of the body 9 adjacent a side thereof, and the drive shafts 22 are each connected to drive a right-angle gear drive 23. The right-angle gear drives are connected by means of shafts 24 with a controlled differential transmission 25 which is disposed adjacent the front end of the vehicle and substantially intermediate the sides of the body 9 in the load space 20. The transmission 25 is connected to drive shafts 26, and the construction of the transmission is such that one of the shafts 26 may rotate at a slower speed than the other shaft when the load on one of the shafts is greater than on the other, for example, as with ordinary differential transmissions, and the transmission may be controlled by any suitable means (not shown) such that either of the shafts 26 may be caused to rotate at a predetermined speed ratio with respect to the other shaft 26. Each of the shafts 26 is connected to drive a reduction gear unit 27, and each of the latter units drives one of the track sprockets 13. For various details of the amphibian vehicle as so far described, such as details of the transmission 25 and of the shapes of the grousers 18, my aforesaid copending application may be referred to.

The transmission 25 and the shafts 24 and 26 connected therewith are enclosed in a housing 29 extending transversely of the vehicle. The housing is provided with air inlet openings 30 at its front and air inlet openings 31 at its rear. The vehicle is provided with a cab 32 at its front end which extends over the transmission 25 and its housing 29 and thus partially over the load space 20. The load space 20, it will be noted, is otherwise open. An operator's seat 33 may be provided on the housing 29, and suitable controls (not shown) may be provided at the front of the housing 29 for use by an operator in controlling the vehicle.

Panelling 34 extending generally longitudinally of the vehicle is provided for the motors 19, the transmissions 21 and the drive shafts 22 as shown. This panelling defines the sides of the space 20, while the ends of the space 20 in which load may be placed are defined by the gate 10 and the extreme front portion of the body 9. The panelling 34, along with the sides of the vehicle, also defines portions 35a of air conduits or ducts 35, which are provided for supplying air to the motors, as will be hereinafter described. The air conduits 35 comprise, in addition to their portions 35a, the portions 35b which are formed by the transmission housing 29 and constitute the entrance portions of the air conduits, and the conduit portions 35a and 35b are in communication at 35c, as shown, in the regions of the right angle gear drives 23. The air ducts 35 include discharge openings 35d on the top of the vehicle directly above the motors 19 as shown. A cover 36 is provided for each of the discharge openings, and the covers are so constructed that air discharged through the openings 35d is discharged outwardly or sidewardly of the vehicle as shown in Fig. 3 and toward the front and rear of the vehicle as shown in Fig. 2, and the cover, as is apparent from Fig. 3, allows none of the air to be discharged inwardly of the vehicle into the load space 20.

A radiator 37 of the usual construction is provided for each of the motors 19 in a duct 35 and adjacent the motor, and the radiator is connected with the water system of the motor for cooling the motor. A fan 38 is disposed behind each of the radiators 37 and is driven by the adjacent motor so as to draw air through the radiator. The fans 38 function to draw air through the openings 30 and 31 of the transmission housing 29 through the entrance portions 35b of the conduits 35, through the openings 35c between the conduit portions 35a and 35b, through the conduit portions 35a, through the radiators 37, over the motors 19 and through the discharge openings 35d.

An arrangement for draining the load space 20 of water is provided and comprises a plurality of drains 39 in the floor of the vehicle and a pump 40 driven by each of the motors 19. Each of the pumps 40 has an inlet 41 underneath one of the drains 39 at the rear of the vehicle, and each pump has an outlet 42 for discharging water from a side of the body 9. The bottom of the vehicle is formed by a plurality of transversely extending channels 43 as shown, and a pipe 44 is provided extending longitudinally of the vehicle through the channels for effectively connecting the drains 39 at the front of the vehicle and those at the rear, so that the pumps 40 are effective for pumping out of the vehicle the water that discharges into all of the drains.

When the vehicle is traveling rough seas with its front end foremost, waves may tend to throw water into the vehicle and into the load space 20, but the cab functions to keep the front end of the load space relatively dry. The water that enters the space 20 flows into the drains 39 and is discharged out of the vehicle by the pumps 40. Due to the fact that the transmission housing 29, which constitutes the inlets for the air ducts 35 is underneath the cab 32, a minimum of water enters through the openings 30 and 31 in the housing to get into the air ducts 35, and this is particularly true in view of the fact that none of the openings 31 and 30 in the housing 29 are at floor level. In the illustrated vehicle, due to this location of the inlets for the air ducts 35, there is thus little danger that the motors will be made inoperative due to excessive amounts of water supplied thereto.

Air entering the inlet openings 31 and 30 in the transmission housing 29 passes around and over the controlled differential transmission 25, and the air functions to cool the transmission so that auxiliary cooling means, such as a radiator for the oil in the transmission, are not necessary. Such location of the entrances to the conduits 35 adjacent the transmission 25 thus advantageously functions to cool the transmission.

Air passing through the ducts 35 goes through the radiators 37 and over the motors and functions to cool the motors and supply air thereto for their carburetors in addition to cooling the transmission 25. The air from the ducts 35 discharges through the openings 35d and sidewardly and endwardly of the vehicle, as hereinbefore described, due to the function of the covers 36. The heated discharge air will thus advantageously not be directed on cargo or personnel in the load space with ill effect.

I wish it to be understood that my invention is not to be limited to the specific constructions and arrangements shown and described, except only insofar as the claims may be so limited, as it will be apparent to those skilled in the art that changes may be made without departing from the principles of the invention.

I claim:

1. In a boat, means defining a space inside the boat for receiving a load, means for propelling the boat through the water and including a motor, means for cooling the motor and including means defining a cooling air conduit in the boat and means for forcing air through the conduit, and means for partially covering said load space and the load space being otherwise open, the entrance to said conduit being underneath said covering means whereby a minimum of water splashing into the load space is drawn into the conduit.

2. In a boat, means defining a space inside the boat for receiving a load, means for propelling the boat through the water and including a motor, means for cooling the motor and including means defining a cooling air conduit in the boat and means for forcing air through the conduit, and a cab for a boat operator at one end of said load space and partially covering the load space, said load space being otherwise open, the entrance to said conduit being underneath said cab whereby a minimum of water splashing into the load space is drawn into the conduit.

3. In a boat, means defining a space inside the boat for receiving a load and including a deck on which a load may be placed, means for propelling the boat through the water and including a motor, means for cooling the motor and including means defining a cooling air conduit in the boat and means for forcing air through the conduit, and a cab for a boat operator at the front of the boat and partially covering said load space, said load space being otherwise open, the entrance to said conduit being underneath said cab and being higher than the level of said deck whereby a minimum of water splashing into the load space is drawn into the conduit.

4. In a boat, means defining a space inside the boat for receiving a load and including a deck on which a load may be placed, means for propelling the boat through the water and including a motor, means for cooling the motor and including means defining a cooling air conduit in the boat and means for forcing air through the conduit, a cab at the front of the boat and partially covering said load space and the load space being otherwise open, the entrance to said conduit being underneath said cab and being higher than the level of said deck whereby a minimum of water splashing into the load space is drawn into the conduit, and a pump driven by said motor for draining said load space of water.

5. In a boat, means defining a space inside the boat for receiving a load, means for propelling the boat through the water and including a motor, means for cooling the motor and including means defining a cooling air conduit in the boat and a fan for forcing air through the conduit and driven by said motor, a cab at the front of said boat partially covering said load space and the load space being otherwise open, transmission mechanism at the front of said boat disposed underneath said cab, and a housing for said transmission mechanism underneath said cab, said transmission housing being provided with openings therein and being connected with said conduit to form the entrance thereto whereby a minimum of water splashing into the load space is drawn into the conduit.

6. In a boat, means for propelling the boat through the water and including a motor positioned in the boat adjacent one side thereof, means for cooling the motor and including a housing for said motor defining a cooling air conduit extending longitudinally of the boat and a fan driven by said motor for forcing air through the conduit, said boat having a space therein defined by said motor housing at one side for receiving a load, a cab at the front of said boat for partially covering said load space and the load space being otherwise open, said boat propelling means including transmission mechanism at the front of the boat underneath said cab and operatively connected with said motor to be driven thereby, and a housing underneath said cab for said transmission mechanism, said housing being provided with a plurality of air inlet openings and being connected with said conduit to constitute the entrance thereof whereby a minimum of water splashing into the load space is drawn into the conduit.

7. In a boat, means for propelling the boat through the water and including a pair of tracks on opposite sides of the boat and a pair of motors in the boat adjacent opposite sides thereof, means for cooling said motors and including a housing for each of the motors, each housing defining an air conduit extending longitudinally of the boat and having an air discharge opening, and a fan driven by each motor for forcing air through the respective conduits and out their discharge openings, said boat having a space inside defined in part by said motor housings for receiving a load, a cab on the front of the boat and partially covering said load space and the load space being otherwise open, means for operatively connecting said motors and said tracks and including transmission mechanism disposed underneath said cab, and a housing for said transmission mechanism underneath said cab and being provided with a plurality of air inlets and being connected with said conduits to constitute the entrances to the conduits whereby a minimum of water splashing into the load space is drawn into the conduits.

8. In a boat, means for propelling the boat through the water and including a pair of tracks on opposite sides of the boat and a pair of motors in the boat disposed adjacent opposite sides of the boat, means for cooling said motors and including a housing for each of the motors, each housing defining a cooling air conduit extending longitudinally of the boat at a side thereof and having an air discharge opening, a radiator in each of the conduits and a fan driven by each of said motors for forcing air through the respective conduits and radiators and out of their discharge openings, means defining a space inside the boat for receiving a load and including said motor housings at the sides of the boat and a deck on which a load may be placed, a cab at the front of the boat partially covering said load space and the load space being otherwise open, means operatively connecting said tracks and said motors and including a transmission underneath said cab and shafts extending longitudinally of the boat through said housings, a housing for said transmission underneath said cab and provided with a plurality of air inlet openings which are at a level higher than the level of said deck, said transmission housing being connected with said air conduits to constitute the entrances to said conduits whereby a minimum of water splashing into the load space is drawn into the conduits, and a pump driven by each of said motors for pumping water out of said load space.

9. In a vehicle, means at each side of the vehicle for propelling the vehicle, a motor in said vehicle, means for operatively connecting said motor and propelling means and including a differential transmission connected with the propelling means on each side of the vehicle, a radiator for cooling said motor, means defining a cooling air conduit in said vehicle between said transmission and said radiator and having its entrance adjacent said transmission, an air discharge outlet for said conduit, and means driven by said motor for forcing air through said conduit and out said discharge outlet for cooling said transmission and also said radiator and thereby said motor.

10. In a vehicle, means at each side of the vehicle for propelling the vehicle, a motor in said vehicle and disposed adjacent one side of the vehicle, means for operatively connecting said motor and propelling means and including a differential transmission connected with the propelling means on each side of the vehicle and disposed adjacent one end of the vehicle intermediate its sides, means defining a cooling air conduit in the vehicle having its entrance adjacent said transmission and extending between said transmission and motor so that air passing therethrough cools both the transmission and motor, an air discharge outlet for said conduit, and means driven by said motor for forcing air through said conduit and out said discharge outlet.

11. In a vehicle, means at opposite sides of the vehicle for propelling the vehicle, a pair of motors in the vehicle disposed adjacent opposite sides of the vehicle, means for operatively connecting said motors and propelling means and including a differential transmission connected with the propelling means on both sides of the vehicle and disposed adjacent one end of the vehicle intermediate its sides, means defining air conduits having their entrances adjacent said transmission and each extending between the transmission and one of said motors so that air passing through the conduits cools the transmission and motors, an air discharge outlet for each conduit, and means driven by said motors for forcing air through said conduits and out the discharge outlets.

12. In a vehicle, a pair of tracks at opposite sides of the vehicle for propelling the vehicle, a pair of motors in said vehicle disposed adjacent opposite sides of the vehicle, means for operatively connecting said motors and said tracks and including a differential transmission connected with the tracks on both sides of the vehicle and disposed adjacent one end of the vehicle and intermediate its sides and a shaft driven by each of said motors and extending longitudinally of the vehicle adjacent a side thereof, means defining a pair of air conduits having entrances adjacent said transmission and each extending between the transmission and one of said motors so that air passing through the conduits passes over the transmission and motors to cool the transmission and motors, an air discharge outlet for each conduit said last named means including a housing for said transmission having a plurality of air inlet vents and extending transversely of the vehicle and a housing for each of said motors and its drive shaft extending longitudinally of the vehicle along a side thereof and in communication with the transmission housing, and means driven by said motors for forcing air through said conduits and out said discharge outlets.

13. In a boat, means for propelling the boat through the water and including a pair of tracks on opposite sides of the boat, means for driving said tracks and including a pair of motors in the boat disposed adjacent opposite sides thereof, a differential transmission disposed adjacent the front end of the boat and intermediate its sides and connected with the tracks on both sides of the boat, a pair of drive shafts extending longitudinally of the boat adjacent opposite sides thereof and each driven by one of said motors and a pair of right-angle gear drives adjacent opposite sides of the boat and adjacent the front end of the boat and each driven by one of said shafts and driving said transmission, a housing for each of said motors and its drive shaft extending longitudinally of the boat adjacent a side of the boat and having an air discharge opening, said housings defining a load space in the boat, a cab at one end of the load space and partially covering the load space, said load space being otherwise open, means defining a pair of cooling air conduits having their entrances adjacent said differential transmission and each having one of said motors therein, said last-named means comprising a housing for said transmission having a plurality of air inlets opening therein and said motor and shaft housings which are in communication with the transmission housing, a radiator for each of said motors in the conduit for the motor, and a fan driven by each of said motors for drawing air through the radiator and the conduit for the respective motor and for forcing the air out of the discharge opening for cooling said transmission and for cooling the motor, said transmission and its housing being disposed underneath said cab whereby a minimum of water splashing into the load space is drawn into said conduits, and a pump driven by each of said motors for pumping water out of said load space.

14. In a boat, means for propelling the boat through the water and including a pair of tracks on opposite sides of the boat, a pair of motors in the boat disposed adjacent opposite sides of the boat, means operatively connecting said motors and said tracks and including a differential transmission disposed adjacent the front end of the boat and intermediate its sides, a pair of drive shafts extending longitudinally of the boat adjacent opposite sides thereof and each driven by one of said motors and a pair of right-angle gear drives adjacent the front end of the boat and connected to be driven by one of said drive shafts and to drive said transmission, means defining a conduit for each of said motors having its entrance adjacent said transmission and having the motor therein, said last-named means comprising a housing for said transmission having a plurality of air inlet openings and a housing for each of said motors and its drive shaft and extending longitudinally of the boat and in communication with said transmission housing, a radiator for each of said motors and disposed in the conduit for the motor, a fan driven by each of said motors for drawing air through the conduit for the respective motor for cooling said transmission, said right-angle gear drives and the motor and its radiator, means including said housings defining a space inside the boat for receiving a load, a cab disposed over said transmission and its housing and partially covering said load space, said load space being otherwise open, a pump driven by each of said motors for pumping water out of said load space, said cab preventing more than a minimum of water splashing into said load space from being drawn into said conduits, each of said conduits having a discharge opening on the top of the boat over the motor in the conduit, and a cover over the discharge opening of each conduit arranged to discharge the air from the conduit toward the ends and outer side of the vehicle and preventing a discharge of air into the load space.

15. In a vehicle, means on the outside of the vehicle for propelling the vehicle, a motor disposed adjacent a side of the vehicle and operatively connected with said propelling means, means defining a load space in the vehicle and including a housing for said motor, said housing defining a cooling air conduit having an outlet on the top of the vehicle at the side of said load space, means for forcing air through said conduit, and a cover on said conduit outlet directing the air discharged therethrough toward the ends and side of the vehicle and preventing a discharge of cooling air into the load space.

16. In a boat, the combination of means on the exterior of the boat for propelling the boat through the water, a pair of motors disposed adjacent opposite sides of the boat and operatively connected with said propelling means, means defining a load space in the boat and including housings for said motors, said housings each defining a cooling air conduit for a motor, a radiator in each of said conduits connected to cool the motor in the conduit, means driven by each of said motors for drawing air through the respective radiator and conduit, each of said conduits having a discharge opening in the top of the boat above the motor, and a cover for each of said discharge openings for preventing the entrance of water into the opening and arranged to direct the cooling air discharged from the opening toward the ends and sides of the vehicle and preventing a discharge of air from the opening into said load space.

17. In a vehicle, means at each side of the vehicle for propelling the vehicle, a motor in said vehicle, means operatively connecting said motor and propelling means and including a differential transmission connected with the propelling means on each side of the vehicle, means defining a cooling air conduit in said vehicle disposed about said transmission and motor and having its entrance adjacent said transmission, an air discharge outlet for the conduit, and means driven by said motor for forcing air over said transmission for cooling the transmission and for forcing air past the motor for cooling said motor and discharging said air through said outlet to the outside of the vehicle.

BENJAMIN A. SWENNES.

REFERENCES CITED

The following references are of record in the file of this patent:

UNITED STATES PATENTS

| Number | Name | Date |
|---|---|---|
| 1,925,415 | Strauss | Sept. 5, 1933 |
| 1,560,351 | Seidel | Nov. 3, 1925 |
| 2,033,731 | Nallinger | Mar. 10, 1936 |
| 2,341,165 | Todd | Feb. 8, 1944 |
| 1,526,258 | Trasky | Feb. 10, 1925 |
| 2,278,255 | Grable | Mar. 31, 1942 |